(No Model.)

J. D. MILLER.
DRAFT ATTACHMENT FOR VEHICLES.

No. 390,889. Patented Oct. 9, 1888.

Witnesses.
Thomas Durant.
A. J. Stewart.

Inventor.
John D. Miller,
by Chas. R. Burr.
his Attorney.

UNITED STATES PATENT OFFICE.

JOHN D. MILLER, OF WASHINGTON, DISTRICT OF COLUMBIA.

DRAFT ATTACHMENT FOR VEHICLES.

SPECIFICATION forming part of Letters Patent No. 390,889, dated October 9, 1888.

Application filed November 23, 1887. Serial No. 256,006. (No model.)

*To all whom it may concern:*

Be it known that I, JOHN D. MILLER, of Washington, in the District of Columbia, have invented certain new and useful Improvements in Draft Attachments for Carts and other Vehicles; and I do hereby declare the following to be a full, clear, and exact description of the same, reference being had to the accompanying drawings, forming a part of this specification, and to the figures and letters of reference marked thereon.

My present invention relates to improvements in draft attachments wherein a spring is used to ease up the strain in starting the vehicle, and is especially adapted for use on carts and heavy vehicles where the draft comes directly from the shafts. It will be remembered that carts, for instance, when heavily loaded, are very hard to start, and that the strain and jar on the shoulders of the animal pulling the same are very great. My invention, however, is intended to and does obviate this objection, and makes the matter of starting any heavy vehicle much easier.

Figure 1:
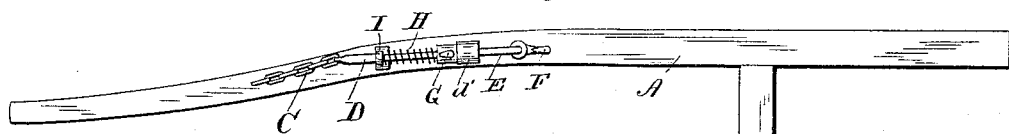
Figure 2:
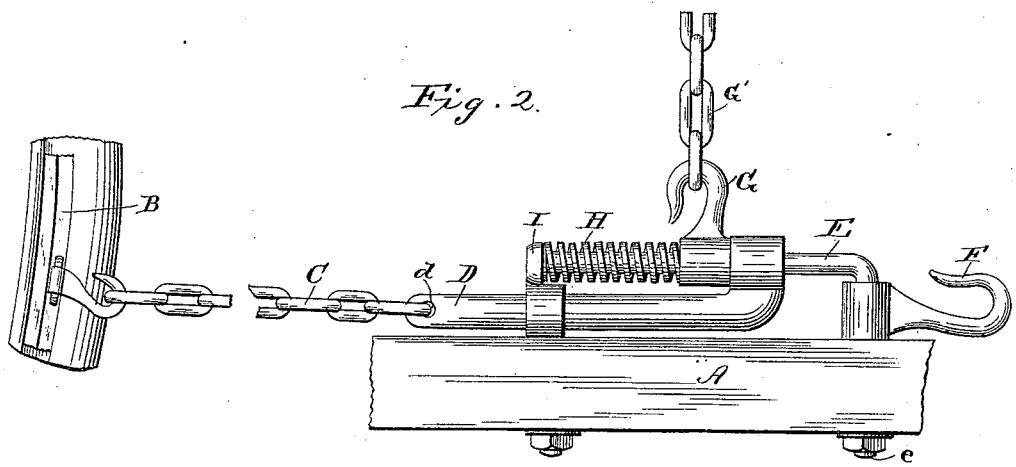
Figure 3:
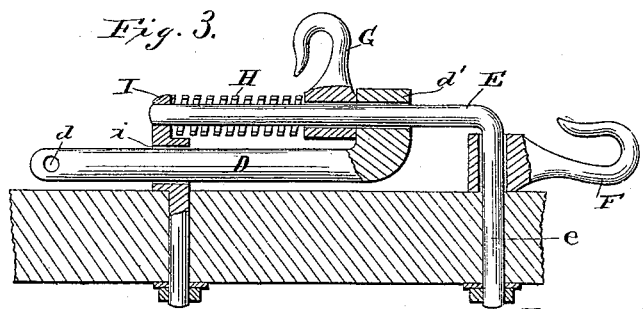

Referring to the accompanying drawings, Figure 1 is a plan view of a pair of shafts with my improvement applied thereto; Fig. 2, a side view showing chain-trace connecting my draft attachment to one of the hames; Fig. 3, a section of my improvement.

Similar letters of reference in the several figures indicate the same parts.

The letter A represents the shafts of an ordinary cart; B, one of the hames, such as is used in cart-harness; C, the chain-trace connecting the hames and the draft-bar D. The draft-bar D has a hole, $d$, in the forward end of the same, in which is secured the chain-trace in any convenient way. The other end of the draw-bar is formed into a slide or socket, $d'$, which encircles and slides upon a bar, E, which is bent at right angles at one end, and first passed through the socket of the breeching-hook F and then through the shaft, and is secured beneath the same by a nut or in any approved way. The other end of this rod E, after passing through the slide $d'$, is passed through the slide or socket on hook G, (which is used in connection with the back-chain G' to support the shafts,) then through a compression-spring, H, and finally is secured to an upright, I. The upright I has an eye or opening, $i$, through which passes the draft-bar D, and which also serves as a guide for the same. Below the eye the upright is formed into a bolt, which is passed through the shaft and fastened in a manner similar to the end $e$ of the bar E, forming a complete staple-shaped attachment, such as is used on carts and vehicles of that class. This upright is made separate from the horizontal bar, to enable the parts to be more readily put together, although it is obvious that it could be made in one piece, with the bar E and the end $e$ turned down after the parts were placed in position. It will be seen that this arrangement of parts forms a neat and compact draft attachment, such as is not liable to get out of order, and will effectually perform the office for which it is intended.

The operation of my invention is as follows: When the vehicle is loaded and is ready to be started, the chain attached to the hames will pull upon the draw-bar D, compressing the spring sufficiently to allow the vehicle to be started without the usual jerk, and at the same time carrying forward the chain, which serves to hold up the shafts and which passes over the back of the animal drawing the vehicle, and thereby prevents the starting of the load with the back-chain and lessening the liability of the saddle to gall. When the load has been started, the spring will of course assume its normal position and be ready to receive the next strain or jar which may come.

Having thus described my invention, what I claim as new is—

1. The combination, with the bar or slide mounted upon the shaft, and having the draw-bar and hook for the back-band mounted thereon and adapted to be moved simultaneously forward by the strain on the draw-bar, of a spring interposed between said draw-bar and the forward end of said bar or slide upon which it is mounted, substantially as described.

2. In a draft attachment for vehicles, a draw-bar to which the draft-chain is attached, having a socket or sleeve at one end, sliding upon a horizontal bar mounted on the shaft and last-mentioned bar having a spiral spring and the slide of a hook for attachment to the back-chain mounted thereon between said socket or sleeve and the forward end of said horizontal bar, whereby said hook will be moved forward simultaneously with the draw-bar, substantially as described.

3. In a draft attachment for vehicles, a draw-bar for engagement with the draft-chain, a socket or sleeve at one end, sliding upon a horizontal bar mounted on the shaft, said last-mentioned bar having a spiral spring and the slide of a hook for attachment to the back-chain mounted thereon between said draw-bar and the forward depending end of said horizontal bar, the said depending end of the horizontal bar having an aperture through which the shank of the draw-bar passes, substantially as described.

4. In a draft attachment for vehicles, a draw-bar for engagement with the draft-chain, having a socket or sleeve at one end, sliding upon a horizontal bar, with depending ends secured to the shaft, the forward depending end of said horizontal bar being detachably secured thereto, and having an aperture therein for the passage of the shank of said draw-bar, substantially as described.

5. In a draft attachment for vehicles, a draw-bar for engagement with the draft-chain, having a socket or sleeve at one end, sliding upon a horizontal bar, with depending ends secured to the shafts, the forward depending end of said horizontal bar being detachably secured thereto, and having an aperture therein for the passage of the shank of said bar, a spiral spring, and the socket or sleeve, of a hook for attachment to the back-chain, being interposed between said socket or sleeve and the forward depending end of said horizontal bar, and a hook for attachment to the breeching on the rear depending end of the horizontal bar, substantially as described.

JOHN D. MILLER.

Witnesses:
THOMAS DURANT,
A. S. STEUART.